(12) United States Patent
Lerche et al.

(10) Patent No.: US 7,116,542 B2
(45) Date of Patent: *Oct. 3, 2006

(54) MICRO-SWITCHES FOR DOWNHOLE USE

(75) Inventors: Nolan C. Lerche, Houston, TX (US); James E. Brooks, Manvel, TX (US); Charles Cameron Abnet, Waltham, MA (US); Clarence H. Chui, Emeryville, CA (US); Stuart B. Brown, Needham, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 241 days.

This patent is subject to a terminal disclaimer.

(21) Appl. No.: 09/946,249

(22) Filed: Sep. 5, 2001

(65) Prior Publication Data

US 2002/0048135 A1 Apr. 25, 2002

Related U.S. Application Data

(63) Continuation-in-part of application No. 09/404,092, filed on Sep. 23, 1999, now Pat. No. 6,385,031.
(60) Provisional application No. 60/230,077, filed on Sep. 5, 2000.

(51) Int. Cl.
*F23Q 21/00* (2006.01)

(52) U.S. Cl. ............ 361/248; 361/250; 361/247; 361/249; 361/251; 361/253; 361/254; 361/255; 361/160; 361/261; 361/112; 361/120; 361/152; 313/112; 313/602

(58) Field of Classification Search .......... 361/247, 361/255, 261, 112, 120, 160, 152, 118, 257, 361/258; 313/112, 602; 200/61.08
See application file for complete search history.

(56) References Cited

U.S. PATENT DOCUMENTS

| | | | |
|---|---|---|---|
| 5,249,095 A | | 9/1993 | Hunter |
| 5,355,959 A | * | 10/1994 | Walter et al. ............ 166/321 |
| 5,638,946 A | * | 6/1997 | Zavracky .................. 200/181 |
| 5,700,969 A | | 12/1997 | Mosley |
| 5,731,538 A | | 3/1998 | O'Brien et al. |
| 5,769,160 A | * | 6/1998 | Owens ...................... 166/65.1 |
| 5,833,490 A | * | 11/1998 | Bouldin .................... 439/462 |
| 5,909,078 A | * | 6/1999 | Wood et al. ............... 310/307 |
| 6,100,477 A | | 8/2000 | Randall et al. |
| 6,385,031 B1 | * | 5/2002 | Lerche et al. ............ 361/248 |

FOREIGN PATENT DOCUMENTS

| | | |
|---|---|---|
| EP | 520407 | 12/1992 |
| WO | 00/22279 | 4/2000 |
| WO | WO 2002/020820 A2 | 4/2000 |
| WO | 01/43450 | 6/2001 |
| WO | WO 2002/001584 A1 | 1/2002 |

* cited by examiner

*Primary Examiner*—Dean A. Reichard
*Assistant Examiner*—Anton B. Harris
(74) *Attorney, Agent, or Firm*—Trop, Pruner & Hu PC; Bryan P. Galloway; Jaime A. Castaño

(57) ABSTRACT

A downhole tool includes a device to be activated by electrical energy and a micro-switch that includes conductors and an element between the first and second conductors selected from the group consisting of: a dielectric element capable of being modulated to provide a conductive path in response to receipt of electrical energy; and an element moveable in response to application of an electrical energy. The micro-switch may be formed of microelectromechanical system (MEMS) technology or microelectronics technology.

25 Claims, 5 Drawing Sheets

MICRO-SWITCHES FOR DOWNHOLE USE

CROSS-REFERENCE TO RELATED APPLICATIONS

This is a continuation-in-part of U.S. patent application Ser. No. 09/404,092, entitled "Switches for Use in Tools," filed Sep. 23, 1999 now U.S. Pat. No. 6,385,031 and claims benefit under 35 U.S.C. § 119 to U.S. Provisional Patent Application Ser. No. 60/230,077, entitled, "MICRO-SWITCHES FOR DOWNHOLE USE," filed on Sep. 5, 2000.

BACKGROUND

The invention relates to micro-switches for use in various tools, such as downhole well tools.

In forming a well, many different types of operations may be performed, including drilling, logging, completion, and production operations. Various different types of devices are used to perform the desired operations. Examples of such devices include perforating guns to perform perforating operations, flow control devices to control fluid flow (injection or production), packers to isolate different regions of the well, and other devices.

The activating mechanisms to activate such devices may include mechanical, hydraulic, and electrical activating mechanisms. To electrically activate a downhole device, a power source is connected to the downhole device. This is typically accomplished by using switches, either at the surface or in a downhole module. The switch is initially open to isolate the power source from the downhole device. When activation is desired, the switch is closed to provide electrical power to the downhole device.

In wellbore applications, one type of switch is made from a gas discharge tube that is either a triggered type of over-voltage type switch. A triggered-type switch employs an external stimulus to close the switch or to activate it. An over-voltage switch is activated whenever the voltage level on one side of the switch exceeds a threshold value.

Some switches employ a gas tube having an electrode at each end. In order to make the switch conduct, either a trigger voltage is applied to a third internal grid or anode, or the switch is forced into conduction as a result of an over-voltage condition. Because the typical gas tube discharge switch is arranged in a tubular geometry, it is usually associated with a relatively high inductance. Also, the tubular shape of a gas tube does not allow convenient reduction of the overall size of a switch. Additionally, it may be difficult to integrate the gas tube switch with other components.

Another type of switch includes an explosive shock switch. The shock switch is constructed using a flat flexible cable having a top conductor layer, a center insulator layer, and a bottom conductor layer. A small explosive may be detonated on the top layer causing the insulator layer to form a conductive ionization path between the two conductor layers. One variation of this is a "thumb-tack" switch in which a sharp metal pin is used to punch through the insulator layer to electrically connect the top conductive layer to the bottom conductive layer.

The explosive shock switch offers a low inductance switch but an explosive pellet must ignite to trigger the switch. The thumbtack switch is similar to the explosive switch but it may not be reliable. Thus, a need continues to exist for switches having improved reliability and triggering characteristics.

SUMMARY

In general, according to one embodiment, an apparatus for use in a downhole tool includes a downhole component, and a switch including conductors and a microelectromechanical device adapted to electrically connect the conductors when activated.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to switches used for activating exploding foil initiators (EFIs), further embodiments may include switches used to activate other components.

As used here, the terms "up" and "down"; "upper" and "lower"; "upwardly" and "downwardly"; "above" and "below"; and other like terms indicating relative positions above or below a given point or element are used in this description to more clearly described some embodiments of the invention. However, when applied to equipment and methods for use in wells that are deviated or horizontal, or when such equipment are at a deviated or horizontal orientation, such terms may refer to a left to right, right to left, or other relationship as appropriate.

Figure 1:
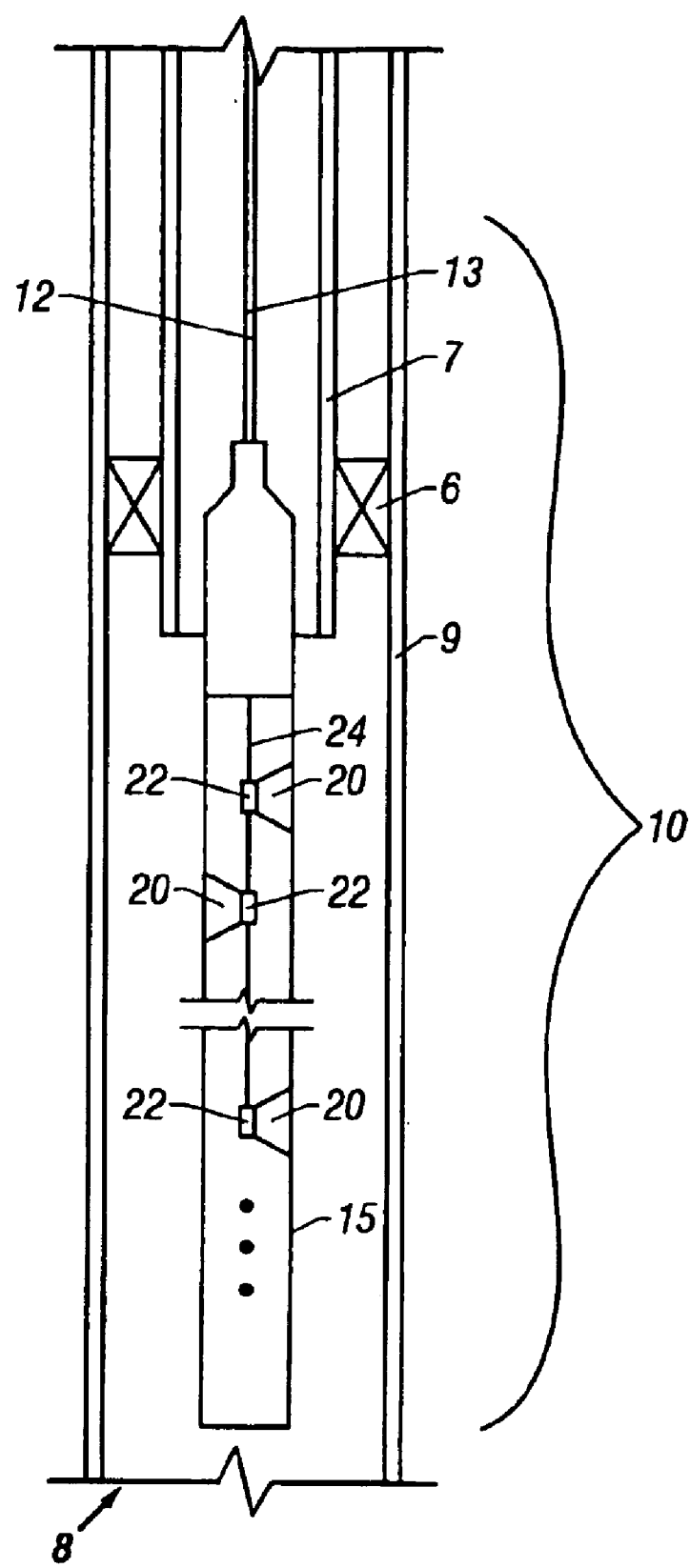
FIG. 1 illustrates an embodiment of a tool string for use in a wellbore.

Referring to FIG. 1, a downhole tool 10, which may include a perforating gun 15 as one example, is lowered through a tubing 7 positioned in a wellbore 8 that is lined with a casing 9. A packer 6 is set between the tubing 7 and the casing 9 to isolate the tubing-casing annulus. The downhole tool 10 is run on a carrier 12, which may be a wireline, slickline, tubing, or other carrier. Certain types of carriers 12 (such as wirelines) may include one or more electrical conductors 13 over which power and signals may be communicated to the downhole tool 10. The perforating gun 15 shown in FIG. 1 includes a plurality of shaped charges 20. In one embodiment, such shaped charges 20 may be detonated by use of initiator devices 22 that are activated by a command issued from the well surface, which may be in the form of electrical signals sent over the one or more electrical conductors 13 in the carrier 12. Alternatively, the command may be in the form of pressure pulse commands or hydraulic commands. The initiator devices 22 may be electrically activated by signals communicated over one or more electrical lines 24.

Other embodiments of the downhole tool 10 may include packers, valves, plugs, cutters, or other devices. Thus, in these other embodiments, the command issued from the well surface may activate control modules to set packers, to open and close valves, or to actuate or release other devices. To activate a device in the downhole tool 10, switches may be provided to connect an electrical signal or electrical power to the device. For example, to initiate an explosive, the initiator device 22 may include a switch and an exploding foil initiator (EFI) circuit.

In accordance with some embodiments, switches may include microelectromechanical elements, which may be based on microelectromechanical system (MEMS) technology. MEMS elements include mechanical elements which are moveable by an input energy (electrical energy or other type of energy). MEMS switches may be formed with micro-fabrication techniques, which may include micromachining on a semiconductor substrate (e.g., silicon substrate). In the micromachining process, various etching and patterning steps may be used to form the desired micromechanical parts. Some advantages of MEMS elements are that they occupy a small space, require relatively low power, are relatively rugged, and may be relatively inexpensive.

Switches according to other embodiments may be made with microelectronic techniques similar to those used to fabricate integrated circuit devices. As used here, switches formed with MEMS or other microelectronics technology may be generally referred to as "micro-switches." Elements in such micro-switches may be referred to as "microelements," which are generally elements formed of MEMS or microelectronics technology. Generally, switches or devices implemented with MEMS technology may be referred to as "microelectromechanical switches."

In one embodiment, micro-switches may be integrated with other components, such as EFI circuits to initiate explosives. Integrated components are contained in smaller packages, which enable more efficient space utilization in a wellbore. As used here, components are referred to as being "integrated" if they are formed on a common support structure placed in packaging of relatively small size, or otherwise assembled in close proximity to one another. Thus, for example, a micro-switch may be fabricated on the same support structure as the EFI circuit to provide a more efficient switch because of lower effective series resistance (ESR) and effective series inductance (ESL). The micro-switch may also be formed on a common substrate with other components.

Figure 2:
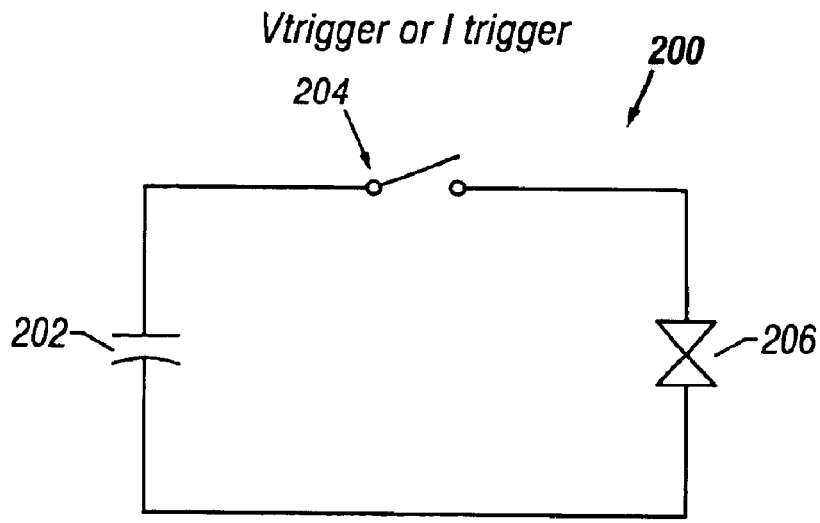
FIG. 2 is a schematic diagram of an exploding foil initiator (EFI) trigger circuit in accordance with an embodiment useable in the tool string of FIG. 1.

Referring to FIG. 2, according to one embodiment, a capacitor discharge unit (CDU) includes a capacitor 202 that is chargeable to a trigger voltage level. The capacitor 202 provides a local energy source to provide activating energy. The capacitor 202 is connected to a micro-switch 204 that may be activated closed by a trigger voltage $V_{trigger}$ or trigger current $I_{trigger}$. When the switch 204 is closed, activating energy is coupled to an EFI circuit 206 to activate the EFI 206.

An EFI circuit typically includes a metallic foil connected to a source of electric current, such as the capacitor 202. A reduced neck section having a very small width is formed in the foil, with an insulator layer placed over a portion of the foil including the neck section. When a high current is applied through the neck section of the foil, the neck section explodes or vaporizes. This causes a small flyer to shear from the insulator layer, which travels through a barrel to impact an explosive to initiate a detonation.

The following describes various embodiments of micro-switches. Such micro-switches are useable in the CDU of FIG. 2, or alternatively, they may be used to connect electrical energy to other downhole components.

Figure 3:
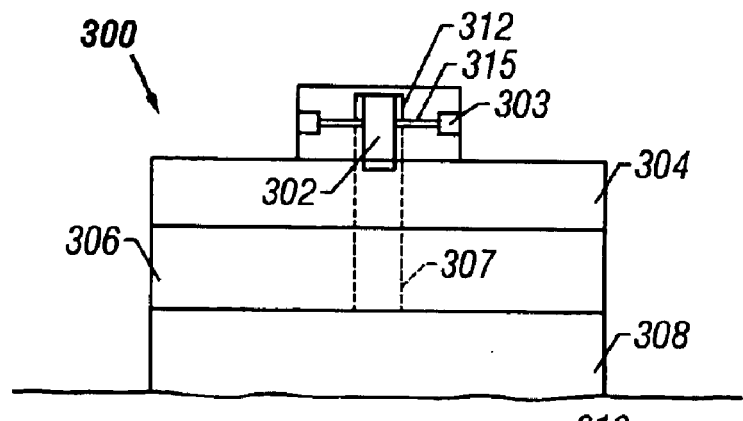
FIG. 3 illustrates an embodiment of a switch including a microelectromechanical tack.

Referring to FIG. 3, according to an embodiment, a MEMS switch 300 is activable by a MEMS tack 302. In this embodiment, the MEMS tack 302 replaces the thumbtack actuator used in some conventional thumbtack switches. The switch 300 includes top and bottom conductor layers 304 and 308 that sandwich an insulating layer 306. The conductors 304 and 308 may each be formed of a metal or some other suitable conductive material. The insulator layer 306 may include a polyimide layer, as an example. The MEMS tack 302 may be placed over the top conductor layer 304. When actuated, such as by an applied trigger voltage $V_{trigger}$ having a predetermined amplitude, an actuator 303 releases the MEMS tack 302 to move through the layers 304 and 306 to contact the bottom conductor layer 308. This electrically couples the top and bottom conductors 304 and 306 to activate the switch 300. Thus, the electrically conductive layer 304 may be driven to a drive voltage $V_{drive}$, while the electrically conductive layer 308 is connected to the component to be activated (e.g., the EFI circuit 206 of FIG. 2).

In one embodiment, a preformed bore 307 may already be present in the layers 304 and 306 through which the MEMS tack 302 may travel. In another embodiment, the MEMS tack 302 may have a sharp tip to puncture through the layers 304 and 306 to reach the layer 308.

In one arrangement, the actuator 303 includes moveable support elements 305 that support the tack 302 at an enlarged flange portion 312. The support elements 305 when withdrawn from the tack flange portion 312 allow the tack 302 to drop into the bore 307. The support elements 305 may be radially moveable by a MEMS gear mechanism 303. When an electrical energy is applied, the MEMS gear mechanism 303 radially retracts the support elements 305 from the tack 302 to enable it to drop into the bore 307 to electrically connect the conductors 304 and 308. In an alternative arrangement, instead of retracting the support from the tack 302, a MEMS gear mechanism 303 may be employed to drive the tack 302 into the bore 307.

The layered structure making up the micro-switch 300 may be formed on a substrate 310, which may be a semiconductor, insulator, or other substrate. In one example, the substrate 310 may be a silicon substrate. The conductor layer 308 is first deposited on the substrate 310, followed by the insulator layer 306 and the next conductor layer 304. The bore 307 may be patterned by an anisotropic etch through the layers 304 and 306. The MEMS structure including the tack 302 and the actuator 303 may then be formed on top of the conductor layer 304 over the bore 307.

Figure 4A:
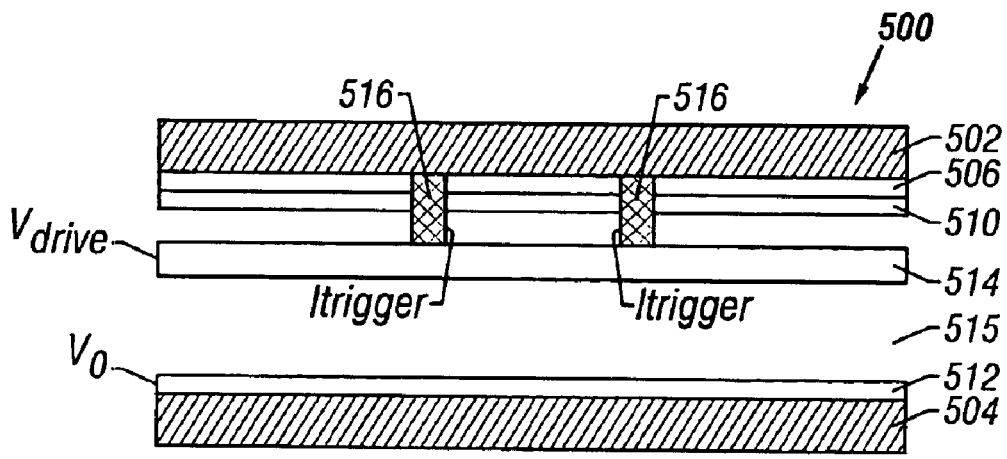
FIGS. 4A–4B illustrates another embodiment of a switch having an electrode tethered by a frangible element.
Figure 4B:
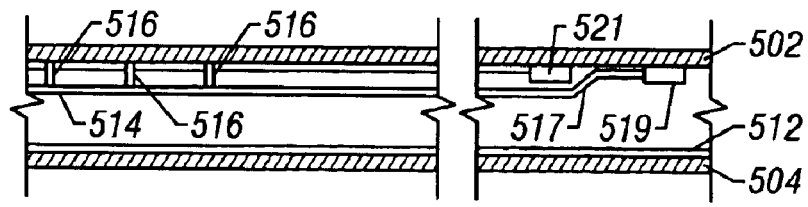

Referring to FIGS. 4A–4B, according to another embodiment, a micro-switch 500 includes a first substrate 502 and a second substrate 504. The first substrate 502 and the layers formed over it are actually shown upside down in FIGS. 4A–4B. In forming the micro-switch 500, the two substrates 502 and 504 are independently patterned, with one flipped upside down to face the other one.

An insulator layer 506 (e.g., a nitrite or $S_xN_y$ layer) is formed over a surface of the substrate 502. A conductive line 510 (e.g., a metal layer including aluminum, nickel, gold, copper, tungsten, and titanium) is formed on the insulator layer 506. A plurality of tethers 516, each made of a semiconductor material such as doped silicon of selected resistivity, may then be formed on the substrate 502 for supporting a conductive plate 514, which may be made of a metal such as aluminum, nickel, gold, copper, tungsten, and titanium. The tethers 516 are bonded to the conductive plate 514 at the contact points between the tethers 516 and plate 514. The tethers 516, when exposed to a relatively large electrical current, disintegrates or otherwise breaks to allow the conductive plate 514 to drop through the gap 515 to contact a conductive layer 512 formed over the substrate 504. Thus, effectively, the tethers 516 are frangible elements that break apart in response to application of an electrical voltage or current.

As shown in FIG. 4B, the tethered plate 514 has a bent portion 517 that allows it to be connected to a bond pad 519 formed over the substrate 502. The bond pad 519 may be contacted to a lead finger, for example, that provides a drive voltage $V_{drive}$ to the tethered conductive plate 514. The tethers 516 are contacted to the conductive line 510, which in turn may be connected to another bond pad 521 that receives a trigger current $I_{trigger}$.

In operation, the conductive plate 514 is driven to a drive voltage $V_{drive}$. When the micro-switch 500 is to be closed (or activated), a trigger current $I_{trigger}$ is applied through the conductive line 510, which breaks or disintegrates at least a portion of the tethers 516. This allows the conductive plate 514 (which is at the drive voltage $V_{drive}$) to drop to contact the conductive layer 512, thereby driving the voltage $V_o$ to the drive voltage $V_{drive}$. The conductive layer 512 (and the voltage $V_o$) may be connected to a device to be activated, such as the EFI circuit 206 of FIG. 2.

Figure 5:
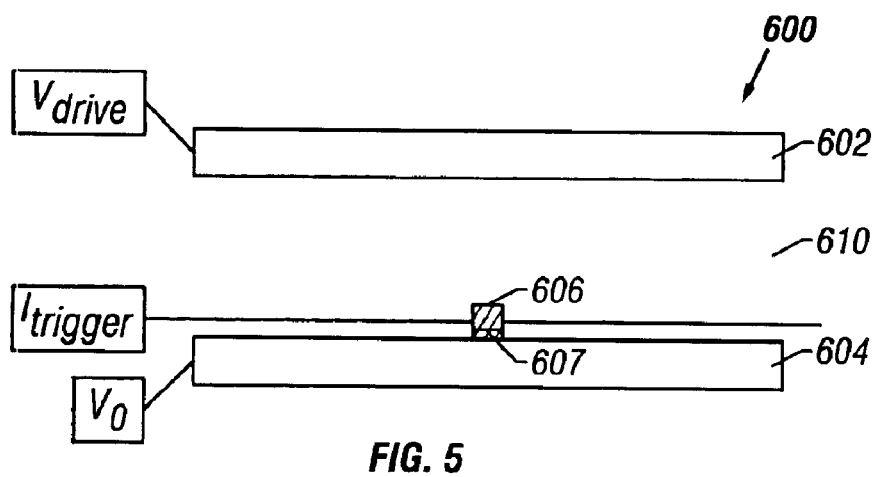
FIG. 5 illustrates yet another embodiment of a switch having parallel plates and a dielectric layer capable of breaking down in response to an applied electrical current.

Referring to FIG. 5, yet another embodiment of a micro-switch 600 includes two parallel plates 602 and 604 with a dielectric layer 610 between the parallel plates. The dielectric properties of the dielectric layer 610 can be modulated by an electrical energy in the form of a trigger voltage or current to provide a conductive path between the two conductive plates 602 and 604. A conductive line 606 may be formed over the conductive plate 604, with an insulator layer 607 between the line 606 and conductive plate 604. The dielectric layer 610 separating the conductive plates 602 and 604 may be a dielectric solid, liquid, or gas. The line 606 when supplied with a trigger current causes the dielectric layer 610 to break down and provide a conductive path between the conductive plates 602 and 604.

In operation, a drive voltage $V_{drive}$ is applied to the conductive plate 602 with the conductive plate 604 coupled to a device to be activated. When a trigger current $I_{trigger}$ is applied to the line 606, the dielectric layer 610 breaks down and the voltage $V_{drive}$ is conducted through the conductive path from the conductive plate 602 to the plate 604 to raise the voltage $V_o$ to the drive voltage $V_{drive}$.

Figure 6:
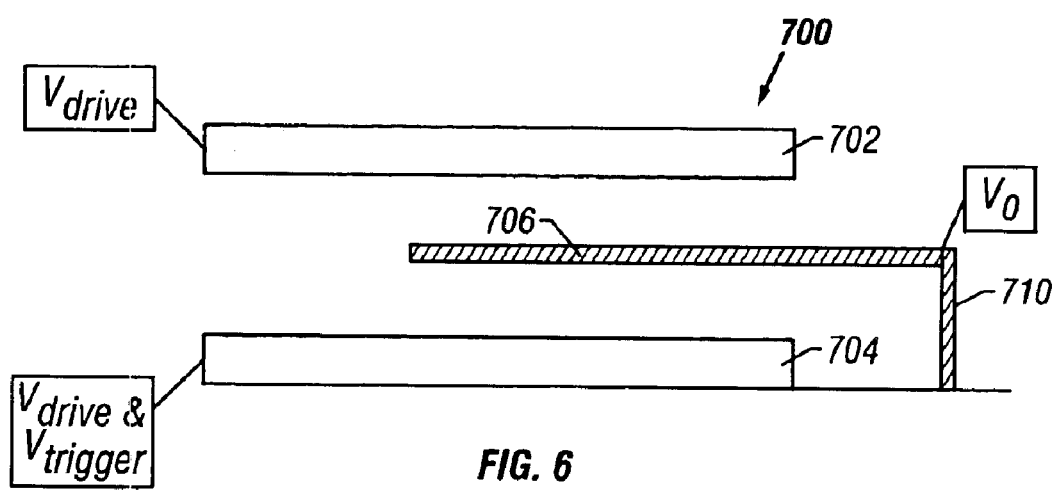
FIG. 6 illustrates a further embodiment of a switch including a bistable element.

Referring to FIG. 6, a micro-switch 700 according to another embodiment includes a bistable microelectromechanical switch 700. The switch 700 includes a contact plate 706 that is maintained at a neutral position (i.e., inactive position) when a drive voltage $V_{drive}$ is applied. The contact plate 706 is positioned at substantially a mid-plane between plates 702 and 704. The plates 702 and 704 are each driven to $V_{drive}$ to maintain the contact plate 706 at its neutral position. When activation of the micro-switch 700 is desired, a trigger voltage $V_{trigger}$ is added to one of the plates 702 and 704 to increase the voltage to $V_{drive}+V_{trigger}$. This creates an electrostatic force to cause an imbalance in the switch, which moves the plate 706 to contact the plate 704. The contact plate 706 at its base end is attached to a support column 710. In one embodiment, the contact plate 706 and support column are integrally formed with a metal to provide a cantilever. The cantilever is adapted to bend by application by an electrostatic force. When the cantilever plate 706 contacts the plate 704, the voltage $V_{drive}+V_{trigger}$ is communicated to the cantilever plate 706.

Figure 7A:
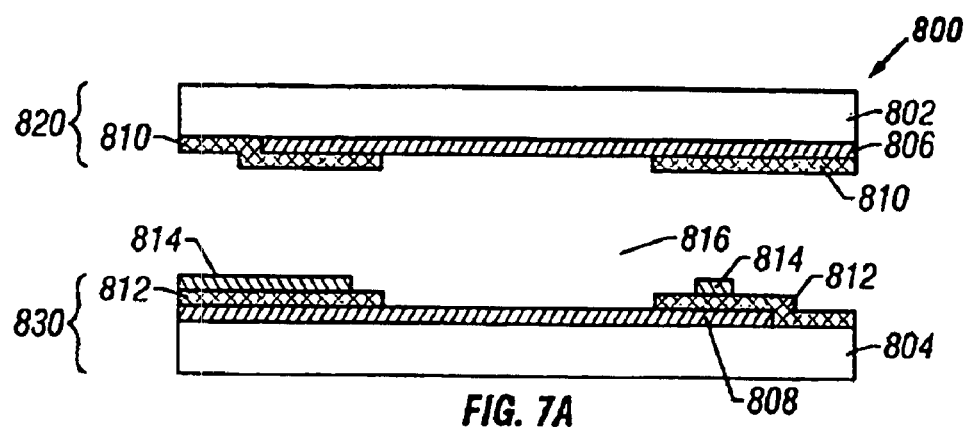
FIGS. 7A–7D illustrate yet a further embodiment of a switch that includes a chamber containing a dielectric gas.
Figure 7B:
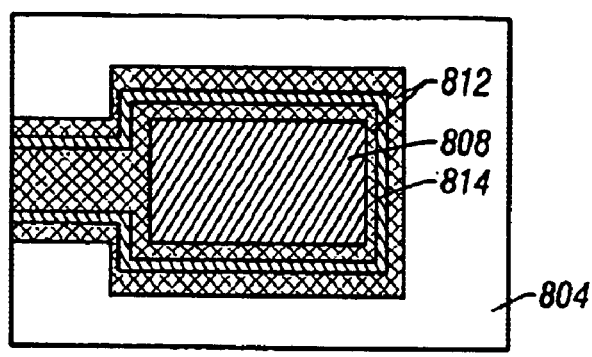
Figure 7C:
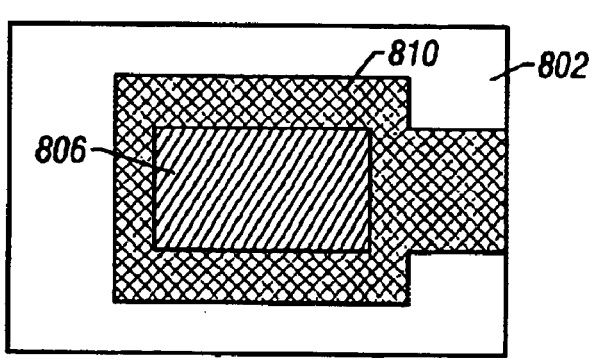

Referring to FIGS. 7A–7D, another embodiment of a micro-switch 800 is illustrated. FIG. 7A is an exploded side view of the micro-switch 800, including a top substrate 802 and a bottom substrate 804. Structures may be formed on each of the substrates 802 and 804. FIG. 7B shows a top view of the bottom substrate 804, and FIG. 7C shows a bottom view of the top substrate 802. A conductive plate 806 and an upper dielectric layer 810 are deposited on the top substrate 802. A lower conductive plate 808 is formed over the bottom substrate 804, and a lower dielectric layer 812 is formed over the lower conductive plate 808. In addition, a triggering electrode 814 is formed over the dielectric layer 812.

As shown in FIG. 7C, the dielectric layer 810 has a portion cut away to form a window exposing the upper conductive plate 806. Similarly, as shown in FIG. 7B, the dielectric layer 812 has a portion cut away to form a window exposing the lower conductive plate 808.

Figure 7D:
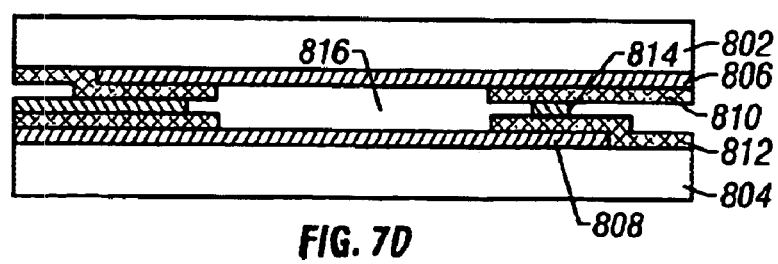

As shown in FIG. 7A, the upper substrate 802 is flipped to an upside down position. When the upper and lower substrates 802 and 804 and attached structures are contacted to each other, the structure of FIG. 7D is achieved. The fabrication of the structure may be performed in a chamber filled with inert gas (e.g., Argon) so that the gap 816 formed as a result of bringing the two substrates 802 and 804 together is also filled with the inert gas. Alternatively, the gap 816 may be filled with another dielectric element, such as a liquid or solid dielectric. The dielectric material is selected to break down upon application of a predetermined voltage or current trigger signal.

In operation, a trigger voltage is applied to the trigger conductor plate 814 that breaks down the insulator in the gap 816 to provide a conductive path between the upper conductive plate 806 and the lower conductive path 808, thereby closing the micro-switch 800.

Figure 8:
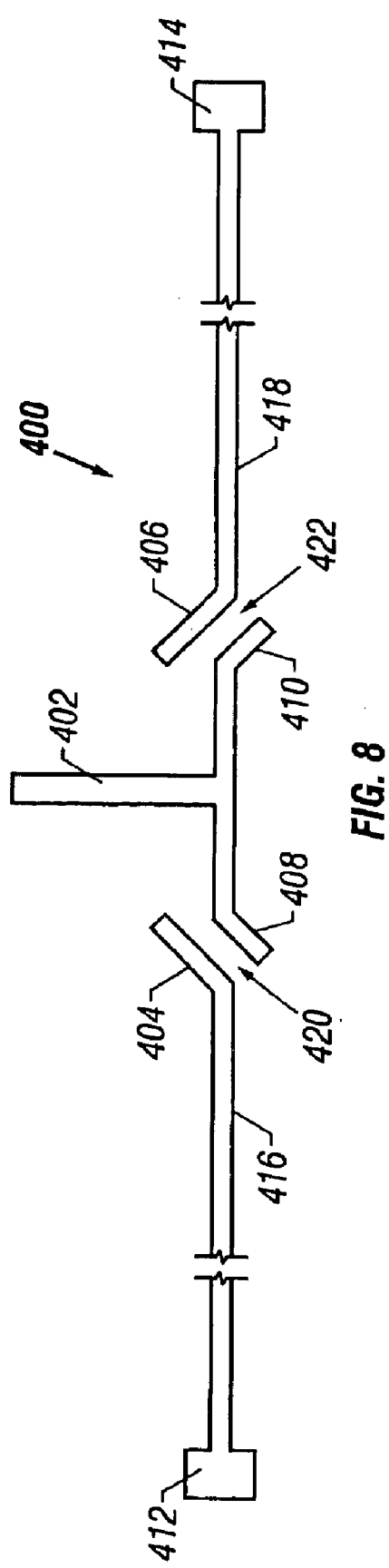
FIG. 8 illustrates another embodiment of a switch including a moveable electrode.

Referring to FIG. 8, according to another embodiment, a MEMS switch 400 may include electrical contacts 404, 406, 408, and 410 separated by gaps 420 and 422. Contacts 404 and 406 are electrically coupled to lines 416 and 418, respectively, which terminate at electrodes 412 and 414, respectively. The electrodes 412 and 414 may be electrically contacted to corresponding components, such as to an energy source and a device to be activated by the energy source. The contacts 404 and 406 are slanted to abut against contacts 408 and 410, respectively, when the contacts 408 and 410 are moved upwardly by an actuator member 402. The actuator member 402 may be moveable by application of a trigger voltage, for example. When the contacts 404, 406, 408, and 410 are contacted to one another, an electrically conductive path is established between the electrodes 412 and 414. Movement of the actuator member 402 may be accomplished by using MEMS gears (not shown).

The contacts 404, 406, 408, and 410 may be formed of metal or some other electrically conductive material. The switch 400 may be formed in a semiconductor substrate, such as silicon.

Advantages of the various switches disclosed may include the following. Generally, the switches may be implemented in relatively small assemblies, which improves the efficiency of the switches due to reduced resistance and inductance. Further, some of the switches may be integrated with other devices, such as EFI circuits, to form an overall package that is reduced in size. Reliability and safety of the switches are enhanced since explosives or mechanical actuation as used in some conventional switches are avoided.

While the invention has been disclosed with respect to a limited number of embodiments, those skilled in the art will appreciate numerous modifications and variations therefrom. It is intended that the appended claims cover all such modifications and variations as fall within the true spirit and scope of the invention. For example, other switch configurations using micro-elements may be used.

What is claimed is:

1. An apparatus comprising:
a component; and
a switch including conductors and a microelectromechanical device adapted to electrically connect the conductors when activated to provide electrical energy to the component,
wherein the microelectromechanical device includes a frangible element, the frangible element adapted to break apart in response to application of electrical energy.

2. The apparatus of claim 1, wherein one of the conductors is attached to the frangible element, the one conductor adapted to move when the frangible element breaks apart to contact the other one of the conductors.

3. The apparatus of claim 2, wherein the frangible element includes a tether formed over a support structure, the apparatus further comprising an electrical line formed over the support structure and in electrical contact with the tether.

4. The apparatus of claim 3, further comprising at least another tether.

5. An apparatus comprising:
a switch including conductors and a microelectromechanical device adapted to electrically connect the conductors when activated to provide electrical energy a component,
wherein the microelectromechanical device includes one of the conductors arranged as a cantilever, the switch further including two other balance conductors initially at substantially the same voltage to balance the cantilever conductor.

6. The apparatus of claim 5, wherein a trigger voltage is applied to one of the two balance conductors to create an electrostatic force to cause the cantilever conductor to move towards the one balance conductor.

7. The apparatus of claim 6, wherein the component is electrically coupled to the cantilever conductor.

8. An apparatus comprising:
a switch including conductors and a microelectromechanical device adapted to electrically connect the conductors when activated to provide electrical energy to a component,
wherein the microelectromechanical device provides a chamber containing a dielectric element placed between the conductors,
the apparatus further comprising a trigger line over which electrical energy may be applied to break down the dielectric element to form a conductive path between the conductors.

9. The apparatus of claim 8, wherein the dielectric element includes a dielectric gas.

10. The apparatus of claim 9, wherein the dielectric gas includes an inert gas.

11. An apparatus comprising:
a component;
a switch including conductors and a microelectromechanical device adapted to electrically connect the conductors when activated to provide electrical energy to the component,
wherein the component includes an exploding foil initiator circuit.

12. A tool for use in a wellbore, comprising:
a component useable in the wellbore;
a micro-switch adapted to couple electrical energy to activate the component, the micro-switch including conductors and a moveable element to form an electrical path between the conductors,
wherein the component includes an exploding foil initiator.

13. The tool of claim 12, wherein the micro-switch is formed by microelectromechanical technology.

14. A switch for use in a tool, comprising:
a first conductor at a first voltage;
a second conductor for coupling to a device in the tool; and
a micro-element between the first and second conductors selected from the group consisting of: a dielectric element capable of being modulated to provide a conductive path in response to receipt of electrical energy; and an element moveable in response to application of an electrical energy,
wherein the dielectric element includes a dielectric gas.

15. The switch of claim 14, wherein the dielectric gas includes an inert gas.

16. The switch of claim 14, wherein the micro-element includes one of a microelectromechanical element and a microelectronics element.

17. A method of fabricating a switch for use in a downhole tool, comprising:
forming a first conductor and a second conductor; and
forming a microelectromechanical element between the first and second conductors, the microelectromechanical element having an inactive state to electrically isolate the first and second conductors and an active state to electrically couple the first and second conductors,
wherein forming the microelectromechanical element includes forming a moveable element,
wherein forming the microelectromechanical element includes forming a cantilever including an electrically conductive material adapted to be moved by an electrostatic force.

18. A method of fabricating a switch for use in a downhole tool, comprising:
forming a first conductor and a second conductor, and
forming a microelectromechanical element between the first and second conductors, the microelectromechanical element having an inactive state to electrically isolate the first and second conductors and an active state to electrically couple the first and second conductors,
wherein forming the microelectromechanical element includes forming a moveable element,
wherein forming the microelectromechanical element includes forming a frangible element and attaching the frangible element to a conductive plate, the frangible element capable of breaking apart in response to electrical energy.

19. An apparatus for use in a downhole tool, comprising:
a downhole component; and
a switch including conductors and a microelectromechanical device adapted to electrically connect the conductors when activated to provide electrical energy to the downhole component,
wherein the microelectromechanical device includes a frangible element, the frangible element adapted to break apart in response to application of electrical energy.

20. An apparatus for use in a downhole tool, comprising:
a downhole component; and
a switch including conductors and a microelectromechanical device adapted to electrically connect the conductors when activated to provide electrical energy to the downhole component,
wherein the microelectromechanical device includes one of the conductors arranged as a cantilever, the switch further including two other balance conductors initially at substantially the same voltage to balance the cantilever conductor.

21. An apparatus for use in a downhole tool, comprising:
a downhole component; and
a switch including conductors and a microelectromechanical device adapted to electrically connect the conductors when activated to provide electrical energy to the downhole component,
wherein the microelectromechanical device provides a chamber containing a dielectric element placed between the conductors, the apparatus further comprising a trigger line over which electrical energy may be applied to break down the dielectric element to form a conductive path between the components.

22. A tool for use in a wellbore, comprising:
a component useable in the wellbore;
a micro-switch adapted to couple electrical energy to activate the component, the micro-switch including conductors and a moveable element to form an electrical path between the conductors,
wherein the micro-switch further includes a multilayered assembly including the conductors and an insulator, the moveable element adapted to move through the insulator.

23. A methof of fabricating a switch for use in a downhole tool, comprising:
forming a first conductor and a second conductor; and
forming a microelectromechanical element between the first and second conductors, the microelectromechanical element having an inactive state to electrically isolate the first and second conductors and an active state to electrically couple the first and second conductors; and
forming an exploding foil initiator circuit coupled to the microelectromechanical element.

24. A method of activating a downhole component, comprising:
providing a micro-switch coupled to the downhole component, the micro-switch having at least one of a moveable member and a dielectric element that can be modulated to provide a conductive path; and
activating the micro-switch to couple an electrical energy to the downhole component,
wherein activating the micro-switch to couple the electrical energy to the downhole component comprises activating the micro-switch to couple the electrical energy to an exploding foil initiator.

25. A method of activating a downhole component comprising:
providing a micro-switch coupled to the downhole component, the micro-switch having at least one of a moveable member and a dielectric element that can be modulated to provide a conductive path; and
activating the micro-switch to couple an electrical energy to the downhole component,
wherein the micro-switch includes a frangible element, wherein activating the micro-switch causes the frangible element to break apart in response to application of the electrical energy.

* * * * *